United States Patent Office 3,251,769
Patented May 17, 1966

3,251,769
LOW FLUID LOSS COMPOSITION AND
METHOD OF USE
R. Jack Brewster, Oklahoma City, Okla., Jack Sutherlin, Golden, Colo., and Edward A. Ernst, Oklahoma City, and Edwin N. Alderman, Jr., Tulsa, Okla., assignors to The Dow Chemical Company, Midland, Mich., a corporation of Delaware
No Drawing. Filed Feb. 17, 1960, Ser. No. 9,179
2 Claims. (Cl. 252—8.55)

The invention relates to an improved additament to drilling mud and well treating liquid compositions to lessen the loss of fluid from such muds and compositions to formations traversed by the well. It particularly relates to oil-base liquid compositions employed in well drilling and treating operations in which porous formations are traversed or penetrated by the well.

Excessive loss of liquid to a formation during drilling or subsequent treatment of a well is highly undesirable. Among such undesirable effects and, therefore, to be lessened or avoided, are contamination of the producing formations and the need for unduly large volumes of mud or treating compositions thereby incurring added material and handling costs. Excessive loss of fluid from drilling mud, and therefore at least partial dehydration thereof, often has the added maliferous consequences of causing excessive caking of the mud on the borehole wall, sticking of the drill-bit or stem, erratic control of density, and improper functioning of the mud as a coolant and scavenger for the bit cuttings. Excessive loss of fluid from hydraulic fracturing liquids during fracturing oftentimes prevents attaining satisfactory pressures for effective fracturing. Such loss of hydraulic fracturing liquid also often results in the disconcerting discovery that the fracturing liquid has largely bled off into readily accessible channels and passageways and only slight amounts thereof have penetrated the smaller channels and pores where fracturing was especially desired.

The need to inhibit such fluid loss sufficiently to provide muds and liquid treating compositions for use in drilling and treating wells has motivated a long and diligent search therefor. Such loss has given rise to a number of compositions having fluid loss value. Among such compositions are those containing cellulose and derivatives thereof, soap and gel-forming compounds, asphalt, finely ground inorganic solids, and more-or-less homogeneous mixtures of neutralized oil-soluble and oil-insoluble petroleum sulfonic acids similar to those described in U.S. Patent 1,935,666, preferably containing an inorganic salt, e.g., residual $Na_2SO_4$ remaining when the sulfonic acids used contained an excess of $H_2SO_4$ and were neutralized with NaOH to produce a composition of the type employed in U.S. Patent 2,779,735.

The problem of excessive fluid loss from drilling muds as well-treating compositions has, however, not been satisfactorily overcome. The ever-widening geographical area which is being explored for economically valuable fluids, especially petroleum, stored in subterranean formations, and the need for removing a larger and larger percentage of the fluids from known producing fields has increased the demand for muds and treating compositions having superior fluid loss properties.

We have discovered an improved composition for admixture with an oil-base drilling mud or an oil-base well-treating composition for lessening the fluid loss therefrom effectively and economically.

The invention is a substantially homogeneous concentrate prepared by heating a hydrocarbon oil (which may be a solid at room temperature) or mixture of hydrocarbon oils, to which reference will usually be made hereinafter as a plasticizer oil, and particulate rubber, at a temperature of between about 400° and 550° F. for a period of between about 0.5 and 5.0 hours, and cooling the mixture; the improved well drilling or treating liquid prepared by admixing a minor proportion of the concentrate thus made with a major proportion of either a suitable oil-base mud or a well-treating fluid; and the method of drilling or treating a well employing said oil-base liquid. Both drilling and treating a well e.g., acidizing or fracturing may be referred to as working a well.

The viscosity of the plasticizer oil to employ is relatively unimportant so long as it can be rendered sufficiently fluid to form a substantially homogeneous mass when it is admixed and heated with the rubber to form the concentrate and which concentrate, whether solid or liquid, when cooled can be mixed with the oil-base mud or well treating liquid and the resulting mud or treating liquid is not too viscous for satisfactory use. The plasticizer oil should have an initial distillation point of above about 400° F. and preferably about 450° F.

Suitable plasticizer oils to employ in the preparation of the rubber-oil composition of the invention are alkyl-substituted benzenes, phenyl-substituted alkanes, and mixtures thereof, tricresyl phosphate, diesel oil, gas oils, residuum from petroleum oil fractionating columns and crackers, and heat-liquefiable solid hydrocarbons such as Gilsonite and para-phenyl. When a plasticizer oil is employed which is solid at prevailing ambient temperatures, the concentrate made is also semi-solid or solid at such temperatures. A solid concentrate which can be admixed directly into a well-working oil often offers a number of advantages over a liquid for use in the field. The oil employed should contain at least some aromatic oils. A preferred oil to employ is a mixture consisting of diesel oil admixed with a mixture of alkyl benzenes and phenyl alkanes. A recommended oil mixture to employ is one consisting of a mixture of diesel oil and the residue or still-bottoms sometimes called polystill-bottoms remaining in the final distillation or fractionation step in the production of ethylbenzene. Since ethylbenzene is a large production commodity (one of its principal uses being for the production of styrene), the still-bottoms are produced in large quantities as a by-product. Illustrative of such still-bottoms remaining in the production of ethylbenzene is the one set out below:

| Ingredient: | Percent by weight |
|---|---|
| Triethylbenzene | 2.5 |
| Tetraethylbenzene | 15.0 |
| Pentaethylbenzene | 15.0 |
| Hexaethylbenzene | 5.5 |
| 1,2-diphenylethane | 0.7 |
| 1,1-diphenylethane | 22.0 |
| Ethylated monophenylethanes | 8.0 |
| Ethylated diphenylethanes | 31.0 |
| Undetermined | 0.3 |

References hereinafter to the above still-bottoms will be as S-bottoms.

Generally speaking, the rubber employed in the practice of the invention may be either unvulcanized, vulcanized, or reclaimed rubber, and may be either natural rubber or synthetic rubber. Among such natural rubbers are gutta percha, balata, para rubber, and such less important sources of rubber as the goldenrod, milkweed, certain species of the mulberry family, Indian kelp, and parthenium, a variety of which grows on the semi-desert area of Mexico.

Among synthetic rubbers useful in the practice of the invention are polymerized polyisobutylene, 2-chloro-1,3-butadiene, isoprene, 2,3-dimethylbutadiene, alkylene polysulfides, alkyl and dialkylsiloxanes, and copolymers among which are butadiene-styrene (known generally as GR–S or more recently as SRB rubber), isoprene- or butadiene-isobutylene, vinylalkylpyridine-butadiene, butadiene-acrylonitrile, and the more recent polymer known as "synthetic natural" rubber.

Reclaimed rubber is the product resulting from the treatment of vulcanized scrap rubber to overcome to some extent the effects of vulcanization, in other words, restore at least some of the characteristics which existed prior to vulcanization. Used tires, both casings and inner tubes of both synthetic and natural rubber, comprise a large percent of the raw scrap used. Methods of reclaiming rubber are widely discussed, e.g., in Chapter 17 of Synthetic Rubber by Whitby, published by John Wiley and Sons, New York (1954). Briefly such methods include the steps of (1) removing metal and the like, e.g., beading from tires, (2) grinding, (3) softening by oil treatment, and (4) either digesting, usually in a hot strong aqueous caustic or sulfuric acid solution, or mechanical working or "devulcanization." In mechanical working, heat is generated to raise the rubber temperature to about 400° F. One method of mechanical working employs a two-roll corrugated mill, air-blown separation sieves, and a screw extruder usually having a nozzle at the outlet which is provided with openings of only a few millimeters across. The extruder may be jacketed and be provided with a temperature control medium. British Patents 610,812 and 610,901 issued in 1948 to the U.S. Rubber Reclaiming Company, describe mechanical "devulcanization" processes of this general type.

When unvulcanized rubber is employed in the practice of the invention, it is first dispersed in a suitable solvent, e.g., toluene, and agitated therein until the rubber is dispersed, about one-half hour usually being ample time therefor when the rubber was previously cut into relatively small pieces, e.g., chunks of about one-half inch or less in size. Agitation may be provided by employing any of a number of mixers, e.g., a Waring Blendor. Additional heat is not necessary when unvulcanized rubber is used. Heat, however, is produced by the shearing and mixing action during the dispersion of the rubber and the temperature may rise as high as 200° F. The rubber thus dispersed in the solvent is then admixed with the base or carrier oil.

When either vulcanized or reclaimed vulcanized rubber is employed, a smooth concentrate can be readily prepared by heating the plasticizer oil to the desired temperature and then slowly admixing therewith the rubber with continuous agitation while maintaining the mixture at the required temperature. The composition is preferably prepared by heating the plasticizer oil to between about 450 and 500° F., then admixing all the rubber with a portion of the plasticizer oil, say about one-half thereof, heating the mixture which may be described as heat-dispersing the rubber in the plasticizer oil, for from 1 to 3 hours with more-or-less continuous stirring, and then admixing the hot rubber-oil mixture with the balance of the plasticizer oil, and, while continuing to stir, allowing the resulting mixture to cool to about room temperature to make a substantially homogeneous concentrate.

The thus cooled rubber-plasticizer oil concentrate of the invention thus prepared is then admixed with an oil-base or water-oil drilling mud, such as those described in Composition and Properties of Oil Well Drilling Fluids, by Rogers (1953), Gulf Publishing Co., Houston, Texas, or an oil-base or water-oil fracturing liquid. Mixing the concentrate with the bulk of the oil is best done near the place where the well-working is to be done. The resulting composition is thereafter used according to generally practiced drilling operations or according to fracturing procedures, e.g., as described in Reissue Patent 23,733, to Farris.

The particulate rubber employed is preferably of a size such that substantially all passes through a No. 10 mesh sieve; a particle size passing through a 20 mesh sieve is recommended. The parts by weight of rubber and plasticizer oil in the concentrate may be between 0.05 and 5.0 parts of rubber to 1 part of the plasticizer oil. However, it is recommended that it be between 0.08 and 2.0 parts of rubber to 1 of the plasticizer or oil and preferably between 0.3 and 1.0 part of the rubber to 1 of the plasticizer oil. Below 0.08 part rubber per part of plasticizer, there is sometimes shown a tendency for the rubber solids to settle out of the concentrate upon standing. The amount of rubber expressed in percent of the rubber-plasticizer oil concentrate is usually between 20 and 40 percent by weight. There is no critical upper limit on the amount of plasticizer oil employed in proportion to the rubber except that of practical operation and convenience. All of the oil to be used in the subsequent well-working operation could be added during the rubber plasticizing stage, but would be clearly unwise. It is uneconomical and unjustified in view of added heating and plasticizing time and additional transportation burden to add more than the necessary amount of oil to get a substantially homogeneous mixture of the concentrate and is clearly preferable to prepare a concentrate and admix the concentrate thus made with the balance of the oil at or near the well site.

In the practice of the invention, the rubber-plasticizer oil concentrate prepared, as described, is admixed with a drilling mud or well-treating oil, e.g., a fracturing liquid, in a ratio of between about 2 gallons and about 100 gallons of the composition per 1000 gallons of the drilling mud or of the treating liquid. Between about 10 and 60 gallons of the rubber-plasticizer oil composition, per 1000 gallons of the oil-base drilling mud or well-treating liquid are usually employed.

One embodiment of the invention advantageously employs an oil-wetting agent in the mud or treating fluid with which the rubber-plasticizer concentrate is admixed.

Another embodiment of the invention advantageously employs suitably finely divided particulate material suspended in a fracturing fluid for use in the rubber-plasticizer concentrate in accordance with the invention. Illustrative of such materials are finely divided inorganic materials, e.g., silica flour of a particle size of between 1.5 and 6.0 microns, pulverized carbon black, sulfur, and blown asphalt. The amount of these supplemental fluid loss agents used in the practice of the invention are employed in varying amounts, dependent upon the additament employed and the special conditions of use. Such particulate materials are usually employed in the amounts of between 10 and 50 pounds thereof per 1000 gallons of the mud or treating liquid.

The preferred embodiment of the invention employs both an oil-wetting agent and a finely divided particulate material, e.g., silica flour, in the composition of the invention. Either the oil-wetting agent, the particulate material, or both may be added to the rubber-plasticizer oil dispersion or the base-oil prior to intermixing the two or after they have been intermixed.

A particularly good oil-wetting agent to employ is an acid salt of an aliphatic diamine which contains between 14 and 16 carbon atoms per molecule. A commercially available diamine of this type, found useful in the practice of the invention, is Redicote-75 produced by Armour & Company, Chicago. The oil-wetting agent is usually employed in an amount between about .01 and 0.1 percent by weight of the oil-base well working fluid.

Although any of the above rubbers or combinations of such rubbers may be used in the practice of the invention, reclaimed vulcanized rubber is usually used. Illustrative of a reclaimed rubber satisfactory for the practice of the invention is that produced by a mechanical working process and obtained from the U.S. Rubber Reclaiming Company, designated herein No. 06, which consists, in percent by weight, essentially of 29.8 natural rubber, 22.1 GR–S rubber, and the remainder chiefly carbon black and small amounts and bits of cord and other rubber-compounding materials such as zinc oxide, sulfur compounds, and antioxidants remaining in the salvaged rubber. A sieve analysis of No. 06 ground rubber according to the U.S. Bureau of Standard Sieve Series is as follows:

| Sieve sizes: | Percent by weight retained on sieve |
|---|---|
| 20 | 0.1 |
| 20–30 | 10.0 |
| 30–40 | 42.6 |
| 40–60 | 30.6 |
| 60–80 | 9.5 |
| 80 | 7.2 |
| Total | 100.0 |

The particle size is not of critical importance but large chunks do not plasticize sufficiently fast to be generally practical. It is recommended that the rubber be of a size such that substantially all of it will pass through a No. 10 mesh sieve and preferably that at least about 40 percent of such size particles will pass through a 40 mesh sieve.

The composition of the invention may be employed in any well known oil-base drilling mud, e.g., those described in Chapter XIII of Roger's book, supra.

Well-drilling and well-treating compositions, e.g., fracturing liquids, employ a wide selection of oils among which are readily available crude oils, e.g., lease oil, kerosene, diesel oil, gas oils, low viscosity residuum or a residuum to which a thinning oil has been added. Any oil which is suitable for use in an oil-base or oil-water emulsion type drilling mud or well-treating fluid is satisfactory as the base or carrier oil in the practice of the invention. The ground rubber-plasticizer oil dispersion prepared as described above, either with or without a wetting agent and/or particulate material suspended therein, may be admixed with the carrying oil in any of the well-known ways, e.g., by means of a paddle-type mixer, blender, or the like. The mud prepared according to the invention is employed in well-drilling operations substantially as done in conventional practice, e.g., as described in Rogers, supra. Likewise, when the composition of the invention is employed in a well treating operation, e.g., fracturing the general procedure is similar to that now conventionally employed, e.g., that described in Farris, supra.

To illustrate the practice of the invention, a large number of examples were run, some of which are set out below, to show the reduction in fluid loss obtained by the practice of the invention. The fluid loss was measured in the examples by one of the methods employed: (1) the procedure set out in the American Petroleum Institute publication, Recommended Practice for Standard Procedure for Testing Drilling Fluids, API RP 29, Section IV, under "Filtration." This test consists essentially of measuring the time of flow of 300 milliliters of fluid through a 7 square inch filtration area composed of one thickness of Whatman No. 50 filter paper at 100 p.s.i. and room temperature, or measuring the volume filtrated at the end of 30 minutes if the entire volume of 300 milliliters has not passed through the filter in less than that time. (2) The procedure known as the Baroid High Temperature-High Pressure filter loss test which consists of measuring the time of flow of 160 milliliters of fluid through a filtration area of 3.7 square inches composed of 2 sheets of Whatman No. 50 filter paper at a predetermined temperature of up to 300° F. and predetermined pressure up to 2,500 p.s.i. The period of measurement employed is usually 25 minutes. (3) The procedure, consisting of measuring the milliliters of fluid lost (usually in a period of 25 minutes) of a fluid by forcing the fluid into a core of specified size, usually of sandstone, at specified temperature and pressure, until the fluid emerges from the opposite end of the core and then measuring the rate of flow at the pressure required to produce the flow.

For use in the examples below, the following composition of the invention was prepared: 8 parts by weight of S-bottoms described above, having a density of 8.4 pounds per gallon, were transferred to a suitable mixing tank. 7.5 parts by weight of diesel oil, having a density of 7.04 pounds per gallon, were admixed with the S-bottoms. Then about half of the mixture thus prepared was transferred to a reactor provided with a heating means and a temperature of the mixture raised to between 464° and 474° F. To the thus-heated mixture were then added 5 parts by weight of the ground rubber No. 06 described above. The rubber was added slowly with continuous stirring taking about 30 minutes for the addition. The reactor was maintained at the specified temperature during the addition of the ground rubber and thereafter for an additional hour. Thereafter the hot mixture from the reactor was pumped into the remaining but unheated portion of the S-bottoms and diesel oil mixture and the entire mixture cooled to a temperature of between 130° and 140° F., the cooling time required being about 2 hours. The composition thus prepared, designated herein X, is illustrative of that of the invention wherein no ground particulate material is suspended therein nor wetting agent is admixed therewith.

A series of examples was then run wherein the above composition was admixed in an amount of either 10 or 20 gallons thereof per 1000 gallons of various samples of crude oil obtained from producing fields distributed over a wide area. 20 gallons of the rubber-plasticizer additament or concentrate thus made are equivalent to about 40 pounds of rubber. The fluid loss of the different crude oils containing the fluid loss dispersion was ascertained according to the Bariod High Temperature-High Pressure filter press test at 180° F. and 1000 p.s.i. The source and API gravity of the crude oil, together with the amount of rubber-plasticizer oil concentrate employed and the fluid loss values of the resulting well-treating fluid are set out in Table I. A run was made in which no fluid-loss preventive was employed; it is designated Blank A in the table.

TABLE I

| Example Number | Source of Crude Oil | | API Gravity | Gallons of X Concentrate per 1,000 Gallons of Crude Oil | Fluid Loss in ml. in 25 Minutes of Crude Oil Containing Concentrate |
|---|---|---|---|---|---|
| | Formation | State | | | |
| Blank A | San Andres | West Texas | 17.8 | None | (1) |
| 1 | do | do | 17.8 | 10 | 34.5 |
| 2 | do | do | 17.8 | 20 | 24.0 |
| 3 | Tensleep | Wyoming | 17.8 | 20 | 14.0 |
| 4 | Deese | Oklahoma | 21.2 | 20 | 14.0 |
| 5 | Dakota D | Colorado | 32.4 | 20 | 9.8 |
| 6 | San Andres | West Texas | 33.8 | 10 | 55.0 |
| 7 | do | do | 33.8 | 20 | 22.8 |
| 8 | Morrow | Oklahoma | 37.0 | 20 | 13.0 |
| 9 | Verde Gallup | West Texas | 42.2 | 20 | 16.0 |
| 10 | Cleveland | Oklahoma | 42.4 | 20 | 15.0 |
| 11 | Devonian | Kansas | 51.8 | 20 | 18.0 |
| 12 | Wilcox | Oklahoma | 59.2 | 20 | 14.0 |

[1] 150 ml. in less than a minute.

Reference to Table I shows that a substantial reduction of fluid loss was attained by employing the composition of the invention.

A second series of examples was run wherein the amount of the composition of rubber-plasticizer oil concentrate X, prepared above was admixed in varying amounts with diesel oil as the base or carrier liquid instead of crude oil. One run was made on the diesel oil to which no concentrate was added and is designated Blank B. Fluid loss was again determined according to the Baroid High Temperature-High Pressure procedure at 180° F. and 1000 p.s.i.

of the composition of the invention when unvulcanized rubber is used and therefore oils of a lower distillation range are satisfactory. During the mixing operation, however, sufficient heat was generated by the shearing action of the blender to raise the temperature of the contents thereof to about 200° F. The rubber thus dispersed in the toluene was thereafter added to diesel oil in an amount of 38.4 milliliters of the toluene-rubber dispersion to 161.6 milliliters of diesel oil, these amounts being in the proportion of 40 pounds of the rubber dispersion per 1000 gallons of the oil-base treating liquid thus prepared.

TABLE III

| Example Number | Name of Unvulcanized Rubber Employed | Type of Rubber | Fluid Loss in ml. in 25 Minutes |
| --- | --- | --- | --- |
| Blank C | None | None | (1) |
| 21 | South American fine para | Natural | 4.5 |
| 22 | South American balata | do | 18.0 |
| 23 | Malayan rib, smoked sheets | do | 34.0 |
| 24 | SRB, formerly known as GR-S rubber. | Polymerized butadiene-styrene. | 41.0 |
| 25 | Silicone | Polymerized dimethyl polysiloxane (A).[2] | 6.0 |
| 26 | do | Polymerized dimethyl polysiloxane (B).[3] | 35.0 |
| 27 | Butyl | Polymerized isoprene-isobutylene. | 85.0 |
| 28 | Thiokol | Polymerized alkylene polysulfide. | 108.0 |
| 29 | Neoprene | Polymerized 2-chloro-1,3-butadiene. | 130.0 |

[1] 150 ml. in less than a minute.
[2] A type, molecular weight about 60,000, contains 30 parts silica fumed with $CCl_4$ and 15 parts diatomaceous earth per 100 parts rubber. The thixotropic effect of the diatomaceous earth results in improved dispersion and more effective plugging of pores.
[3] B type, molecular weight about 60,000, contains 62 parts of silica fumed with $CCl_2$ per 100 parts of the rubber.

TABLE II

| Example Number | Gallons of Rubber-Plasticizer Oil Concentrate X/1,000 Gallons of Diesel Oil | Fluid Loss in 25 Minutes |
| --- | --- | --- |
| Blank B | None | (1) |
| 13 | 2 | 93.0 |
| 14 | 5 | 54.5 |
| 15 | 10 | 24.5 |
| 16 | 15 | 16.0 |
| 17 | 20 | 15.0 |
| 18 | 30 | 9.0 |
| 19 | 40 | 6.8 |
| 20 | 60 | 6.7 |

[1] 150 ml. in less than a minute.

Reference to Table II shows that effective fluid loss reduction was obtained by employing from 2 gallons to 60 gallons of the rubber-plasticizer oil composition per 1000 gallons of diesel oil according to the invention. It also shows that after the addition of about 20 gallons of the rubber plasticizer composition per 1000 gallons of diesel oil, the employment of additional amounts of the composition in the practice of the invention appears to be uneconomical.

To show the effects of using unvalcanized rubber in the practice of the invention, a series of examples was run wherein the composition of the invention was prepared as follows:

Various types of unvulcanized natural rubber or synthetic rubber were cut into chunks of a size that the average length was about ⅛ inch along the largest dimension. 5 grams thereof were placed in 173 grams (about 200 milliliters) of toluene, as the plasticizer oil, and the mixture agitated for 30 minutes in a Waring blender at high speed whereby the rubber was dispersed therein. Particularly suitable plasticizer oils other than toluene to employ are benzene, gasoline, $CCl_2$, and $CS_2$ which swell the unvulcanized rubber more rapidly than the heavier oils. It is unnecessary to employ outside heat in the preparation The treating liquids thus made were tested for fluid loss according to API RP 29, at 80° F. and 100 p.s.i. The type of unvulcanized rubber employed and the fluid loss obtained according to the tests are set out in Table III. Blank C was diesel oil which contained no additive.

By reference to Table III it can be readily seen that the fluid loss attained according to the practice of the invention varies in accordance with the type of unvulcanized rubber used. However, all the rubbers employed showed improvemen in fluid loss control. It is clear that the natural rubbers, particularly para rubber, and the silicone rubbers employed, produced superior results. Para rubber, the molecular structure of which is the cis form, is the rubber of the *Hevea braziliensis* tree. Balata is similar to gutta percha, both being obtained from a variety of Sapotaceae tree and having the trans molecular structure.

*Example 30*

To show the use of vulcanized rubber which was not reclaimed or otherwise treated other than grinding prior to use in the invention, natural rubber (*Hevea braziliensis*) was vulcanized according to a conventional vulcanizing procedure and ground to a particle size which would pass through a 20 mesh sieve but would be retained on a 40 mesh sieve. S-bottoms, described hereinbefore, and diesel oil were then mixed in a ratio of 1:1 by volume. Forty ml. of the oil mixture thus made was then admixed with 12 grams of the ground rubber and heated to a temperature of between 475° and 500° F. for about 2 hours with occasional stirring. A thickened mass was thereby prepared to which were then added an additional 40 ml. of the S-bottoms-diesel oil mixture and cooled. The concentrate thus formed was then admixed in an amount of 20 gallons per 1000 gallons of diesel oil to make a well fracturing liquid in accordance with the invention and the fluid loss thereof determined by the Baroid High Temperature-High Pressure method at 180° F. and 1000 p.s.i. The results are set forth in Table IV below.

Example 31

Example 30 was repeated except GR–S (styrene-butadiene) rubber instead of natural rubber was vulcanized, ground, intermixed, and heated with the S-bottoms and diesel oil mixture. The concentrate thus formed was admixed in the amount of 20 gallons of the concentrate to 1000 gallons of diesel oil and the fluid loss measured as in Example 30. The result is set out in Table IV below.

A blank run was made for comparative purposes on: the diesel oil to which no fluid loss preventive was added. The results are also set out as Blank D in Table IV below.

TABLE IV

| Example Number | Fracturing Fluid | Fluid Loss Employed in Amount of 20 Gal./1,000 Gal. of Fluid | Fluid Loss |
| --- | --- | --- | --- |
| Blank D | Diesel Oil | None | 200 ml. in 13 seconds. |
| Example 30 | ___do___ | Natural rubber-plasticizer concentrate. | 200 ml. in 22 minutes. |
| Example 31 | ___do___ | GR–S rubber-plasticizer concentrate. | 19 ml. in 30 minutes. |

Reference to Table IV shows that either natural or synthetic rubber may be vulcanized and, without further treatment, ground and employed in the practice of the invention as a satisfactory fluid loss preventive or inhibitor. It also shows that the GR–S synthetic rubber was more effective when tested by the Baroid High Temperature-High Pressure method than the natural rubber.

To show the effect of varying the plasticizer oil employed in the preparation of the rubber dispersion prior to admixture with the treating oil, a series of examples was run as follows:

The rubber-plasticizer oil concentrate X according to the invention, was prepared as in the examples of Tables I and II (employing ground reclaimed vulcanized rubber scrap) except that the plasticizer oil employed was one of the following: All S-bottoms, all diesel oil, or a mixture of 1.6 parts by weight S-bottoms and 1.4 parts by weight of diesel oil. The proportions thus employed were 3 parts by weight of the plasticizer oil per part of rubber. Each of these plasticizer concentrates thus prepared were admixed with separate quantities of kerosene in the amount of 20 gallons of the rubber-plasticizer concentrate per 1000 gallons of the kerosene and the fluid loss thereof determined according to the Baroid High Temperature-High pressure procedure at 180° F. and 1000 p.s.i. The viscosities of the plasticizer concentrate and the fluid loss values obtained when admixed with the kerosene are set out in Table V below.

TABLE V

| Example Number | Plasticizer Oil Employed | Viscosity in Centipoises of Rubber-Plasticizer Oil Concentrate X[1] | Fluid Loss in ml. in 25 Minutes of Kerosene Containing Concentrate X |
| --- | --- | --- | --- |
| 32 | S-bottoms | 12,050 | 24 |
| 33 | Diesel Oil | 1,250 | 54 |
| 34 | 1.6 parts S-bottoms and 1.4 parts diesel oil. | 4,000 | 26 |

[1] 20 gallons of 1:3 by weight rubber to plasticizer oil concentrate per 1,000 gallons of kerosene.

By reference to Table V it can be seen that the viscosity of the mixture of S-bottoms and diesel oil is more desirable than the higher viscosity produced by the S-bottoms alone or the lower viscosity produced by the diesel oil alone. Furthermore, it can be seen that the mixture of S-bottoms and diesel oil, which was more easily pumped and handled than the S-bottoms alone, produced substantially the same fluid loss benefits as the S-bottoms alone.

To show the effect of employing a wetting agent in the practice of the invention, either Redicote-75 (described hereinabove) or Arquad 2S was admixed with the rubber-plasticizer concentrate which was used in the examples set out in Tables I and II for subsequent admixture with the base-oil in those examples. The rubber-plasticizer concentrate thus prepared was then admixed with kerosene in the amount of 20 gallons of the dispersion per 1000 gallons of kerosene. Fluid loss values were then obtained by passing the treating composition of the invention through a 1 inch diameter sandstone core, ¾ inch long, having a pressure differential at 80° F. of 100 p.s.i. between the intake end of the core and the outlet end.

This procedure for ascertaining fluid loss has been found to be a somewhat more sensitive test than that of the filter paper employed in API RP 29 and in the Baroid High Temperature-High Pressure test. The amounts of Redicote-75 or Arquad 2S used and the fluid loss values obtained are set out in Table VI.

TABLE VI

| Example Number | Pounds of Wetting Agent per 1,000 Gallons of Kerosene Containing 20 Gallons of Rubber-Plasticizer Concentrate | Fluid Loss in ml. in 25 Minutes |
| --- | --- | --- |
| Blank E [1] | | 26.0 |
| 35 | None | |
| 36 | 1.5 Redicote-75 | 6.6 |
| 37 | 1.0 Redicote-75 | 7.8 |
| 38 | 1.0 Arquad 2S [2] | 9.8 |

[1] Blank E: Kerosene alone (containing no additive) was forced through the core at the conditions of the test and showed a fluid loss of 50 ml. in 1 minute.
[2] Arquad 2S is a mixture of difatty alkyl quaternary ammonium chlorides, the alkyl groups of a given sample consisting in percent by weight of 8 octyl, 9 decyl, 47 dodecyl, 18 tetradecyl, 8 hexadecyl, and 10 octadecyl.

Reference to Table VI shows that a wetting agent of the type shown definitely improves the fluid loss properties of the composition of the invention.

To show the effect of employing a finely divided oil-insoluble material in the composition of the invention to improve the properties thereof, a series of examples was run as follows:

Concentrate X was prepared as in the examples of Tables I and II and admixed with diesel oil in the amount of 20 gallons of concentrate per 1000 gallons of the diesel oil. Thereafter the amount of the particulate material set out in the table was added to the diesel oil-concentrate mixture per 1000 gallons of diesel oil present and the fluid loss of the treating composition thus prepared ascertained according to the Baroid High Temperature-High Pressure procedure at 180° F. and 1000 p.s.i.g. The results are set out in Table VII below.

TABLE VII

| Example Number | Pounds of Particulated Solids per 1,000 Gallons of Diesel Oil Containing 20 Gallons of the Rubber-Plasticizer Concentrate | Fluid Loss in ml. in 25 Minutes |
| --- | --- | --- |
| 39 | None | 23.0 |
| 40 | 25 Blown Asphalt | 13.0 |
| 41 | 50 Blown Asphalt | 11.0 |
| 42 | 25 Ground Silica, 15,000 to 60,000 A | 12.4 |

Reference to Table VII shows that the already low fluid loss attained by the composition of the invention, prepared by employing 20 gallons of the rubber-oil concentrate per 1000 gallons of the oil-base treating liquid, as shown by Example 17 of Table II, was improved when particulate blown asphalt or silica was employed in the amounts set out in Table VII.

A further series of examples of the invention was run wherein both a wetting agent and a particulate oil-insoluble material were employed. The examples consisted of admixing 20 gallons of the rubber-plasticizer oil dispersion, employed in the examples of Tables I and II, the amount of particulate Redicote-75 (described hereinbefore) which is set out in Table VIII, and 16 pounds of ground silica per 1000 gallons of kerosene. The fluid loss of the oil-base well-treating composition thus made was ascertained as in the Examples of Table VI according to the Baroid High Temperature-High Pressure procedure. The fluid loss values obtained are set out in Table VIII.

TABLE VIII

| Example Number | Amount of Oil Wetting Agent and Ground Silica in Pounds per 1,000 Gallons Kerosene Containing 20 Gallons of the Rubber-Plasticizer Concentrate X | Fluid Loss in ml. in 25 Minutes |
| --- | --- | --- |
| 33 [1] | (No Redicote-75 and no silica used) | 26.0 |
| 43 | 16 Ground Silica | 10.3 |
| 44 | 1.5 Redicote-75 plus 16 lb. Ground Silica | 6.1 |
| 45 | 1.0 Redicote-75 plus 16 lb. Ground Silica | 7.2 |
| 46 | 0.5 Redicote-75 plus 16 lb. Ground Silica | 9.4 |

[1] Repeated from Table V for comparison.

Reference to the results obtained by employing the sandstone core as shown in Table VIII clearly supports the conclusion that, although the presence of either a wetting agent or a suitable particulate material improves the fluid loss properties of the composition of the invention, the presence of both the wetting agent and a particulate oil-insoluble material produces a more marked improvement in lessening the fluid loss.

To show the effect on fluid loss of the practice of the invention at various temperatures, simulating downhole temperatures, a series of examples was run wherein the composition employed in Table VIII above was run with the exceptions: that crude oil was employed as the base-oil and Redicote-75 was employed in each example in an amount of 6.25 parts by weight per 100 parts of the ground silica. The source of the crude oil employed and the A.P.I. gravity thereof are set out together with the fluid loss of the treating composition thus made, as determined according to the Baroid High Temperature-High Pressure procedure, are shown in Table IX.

fracturing liquid, or, in contrast thereto, admixing the fluid-loss concentrate with the carrier oil prior to converting the oil to a gelled carrier oil, fracturing gels were prepared as follows: 0.75 part by volume of a fatty acid mixture consisting of (1) 85 percent of a mixture consisting of 6 percent rosin acids, 40 percent linoleic acid, 50.3 percent oleic acid, and balance largely saturated acids (chiefly lauric, palmitic, and stearic), and a small amount of linolenic acid and unsaponifiables and (2) 15 percent of a mixture consisting of about 94 percent caprylic acid, 4 percent capric acid, and 2 percent caproic acid, was admixed with a 30 percent by weight aqueous solution of sodium hydroxide containing 1.1 percent Arquad 2S (described in the footnote of Table VI) by volume, the soap-gel was added to 100 parts by volume of diesel oil to form a gelled fracturing liquid to which was then admixed the rubber-plasticizer composition additament or concentration of the invention employed in the examples set forth in Table II in an amount of 20 gallons of the rubber composition per 1000 gallons of the gelled fracturing liquid. Fluid loss of the fracturing liquid thus made was determined according to the Baroid High Temperature-High Pressure procedure and the results thereof set forth as Example 50 of Table X. The example was then repeated except that the rubber-plasticizer concentrate was admixed with the diesel oil prior to converting the oil to a gelled oil. The fluid loss of the treating composition so made is set out as Example 51 of Table X.

Two more examples, viz, 52 and 53, were run employing a gel composition. The gel composition employed in these two examples was prepared by admixing 5.73 pounds of palmitic acid with 1.4 gallons of diesel oil in a container provided with a temperature control jacket and stirrer and heating the contents to 200° F.

0.72 pound of flaked hydroxide was then admixed with 0.745 gallon of diesel oil in a separate container and heated to 200° F. with continued agitation to prepare the gelled oil.

The oil containing the NaOH was then slowly added to the palmitic acid-oil solution at 200° F. while being stirred. The temperature was maintained at about 200° F. and stirring continued for another half hour. The mixture was then cooled to about 180° F. at which time stirring was discontinued and the mixture then cooled down to room temperature. 0.36 gram of the concentrated gel thus prepared was then added to 100 milliliters of diesel oil. Thereafter in Example 52, rubber-plasticizer oil concentrate X of the invention was added to the concentrated gel dispersed in the diesel oil as thus prepared. The fluid

TABLE IX

| Ex. No. | Source of Crude Oil Employed | API Gravity of Crude Oil | Fluid Loss in ml. of Crude Oil-Base Treating Composition Containing 20 Gallons Concentrate X per 1,000 Gallons of Oil in 25 Minutes | | | |
| --- | --- | --- | --- | --- | --- | --- |
| | | | 80° F. | 140° F. | 180° F. | 300° F. |
| 47 | Madison Formation, Wyoming | 28.1 | 8.0 | 8.5 | 12.0 | 12.5 |
| 48 | Fulton Formation, Oklahoma | 35.4 | 11.0 | 13.0 | 17.0 | 20.0 |
| 49 | Rodessa Formation, Oklahoma | 46.7 | 12.0 | 10.3 | 13.5 | 16.0 |

Referring to the results set forth in Table IX it can be seen that a pronounced lessening in fluid loss is attained in the practice of the invention employing various crude oils at temperatures between 80° and 300° F. as shown by the lessening in fluid loss.

For comparative purposes each of the crude oils of Table IX was tested according to the Baroid High Temperature-High Pressure method in which no fluid loss additament was used. Fluid loss for each of the crude oils was over 150 milliliters in less than 1 minute.

To show the effect on fluid loss of different gelled well treating fluids prepared by admixing the fluid-loss concentrate of the invention with either a prepared gelled loss thereof was ascertained as in Examples 50 and 51. Example 53 was run similarly to Example 52 except the rubber-oil concentrate was added prior to gelling the oil as was done in Example 51. The results of Examples 52 and 53 are also set out in Table X.

Another fracturing liquid was then prepared as follows: 3.5 milliliters of water were admixed with 0.5 milliliter of an emulsifying agent consisting of 25 parts by volume of an alkyl aryl polyether alcohol prepared by condensing tertiary octaphenol with 12 moles of ethylene oxide and 6 parts of isopropyl alcohol dissolved in 19 parts of water. The aqueous mixture thus made was then admixed with 96 milliliters of diesel oil and stirred until an oil-in-water emulsion was formed. Thereafter, the rubber-plasticizer concentrate of the invention was admixed with the thus prepared gel and the fluid loss determined as in Examples 50 to 53 and is set out in Table X as Example 54.

Two additional examples, viz, Examples 55 to 56, were run employing a composition which was an acid-in-oil emulsion. The fracturing liquid employed in Example 55 was prepared as follows: an emulsifier was made by mixing together 1 part of xylene and 1 part by volume of Arquad-2S (described above). To the emulsifier thus prepared were admixed 9.2 ml. of diesel oil. To the emulsifier-oil mixture thus made were added 90 milliliters of a 15 percent by weight aqueous hydrochloric acid solution (containing 0.5 milliliter of propargyl alcohol as an inhibitor) and mixed for an additional minute thereby forming an emulsion. The emulsion thus prepared was admixed with the concentrate of the invention employed in Examples 50 to 54.

Example 56 consisted of repeating Example 55 except that the rubber-plasticizer concentrate of the invention was admixed with the diesel oil prior to its being emulsified with the acid. Fluid loss values were obtained on the emulsions of both Examples 55 and 56 thus made and are set out in Table X.

TABLE X

[Fluid loss of gelled or emulsion fracturing fluids containing 20 gallons of rubber-plasticizer Concentrate X of the Invention per 1,000 gallons of fracturing fluid]

| Example number: | Fluid loss in ml. in 25 minutes |
|---|---|
| 50 | 16 |
| 51 | 16 |
| 52 | 14 |
| 53 | 14 |
| 54 | 16 |
| 55 | 43 |
| 56 | 39 |

To show the effect on fluid loss of a drilling mud by admixing therewith a composition prepared according to the invention, an oil-base drilling mud was prepared as follows: To one barrel (42 gallons) of diesel oil were admixed 4.5 pounds of a 33 percent by weight aqueous solution of NaCl, 2 pounds of a 50 percent by weight aqueous solution of NaOH, 14.35 pounds of sodium silicate, and 14.35 pounds of tall oil. The mud thus prepared was divided into two portions. To one portion was admixed the fluid loss concentrate X of the invention in the amount of 20 gallons thereof per 1000 gallons of the drilling mud. The fluid loss of the two compositions thus prepared, one without the fluid-loss preventive, for comparative purposes and the other according to the invention, were ascertained by the Baroid High Temperature-High Pressure method. The results are set out in Table XI as Blank F and Example 57, respectively.

To show the effect on fluid loss, of aqueous workover fluids, e.g., one used when perforating a casing of a producing well, a work-over mud was prepared as follows: 360 pounds of vegetable residue acids known as VR-1 acids, as described in U.S. Patent 2,471,230, were admixed with 25 pounds of tetraethylenepentamine and the resulting mixture heated to about 400° F. until substantially all the water had evaporated. The mixture was then cooled to 200° F. and an organic solvent consisting, by weight, of about 80 percent aromatic and 20 percent aliphatic hydrocarbons (the latter containing between 6 and 10 carbon atoms per molecule) admixed therewith. A highly effective emulsifying agent was thus formed.

To the emulsifying agent thus formed were then admixed 2520 gallons of a CaCl₂ brine (having a density of 9.3 pounds per gallon and made up to simultate a brine existing in a producing well) and 163.5 gallons of diesel oil to form a homogeneous emulsion.

The emulsion thus formed was divided into two portions. To one portion was admixed 20 gallons of the fluid loss additament according to the invention. The fluid loss was ascertained for each of the portions according to the Baroid High Temperature-High Pressure method at 180° F. and 1000 p.s.i. The fluid loss values for the mud containing no fluid loss preventive is designated Blank G and that for the mud prepared according to the invention is designated Example 58 in Table XI.

TABLE XI

| Example Number | Type of Mud | Amount Rubber-Plasticizer Oil Additament | Fluid Loss in ml. in 25 Minutes of Mud |
|---|---|---|---|
| Blank F | Drilling Mud | None | 71.0 |
| Example 57 | do | 20 gal./1,000 gallons of mud | 6.5 |
| Blank G | Workover Fluid | None | (¹) |
| Example 58 | do | 20 gal./1,000 gallons of mud | 11.0 |

¹ 150 ml. in 4 min.

To illustrate the use of a plasticizer oil in the invention which exists as a solid at room temperature or field conditions, but which may be admixed with an oil for use in working a well, Example 59 was run.

*Example 59*

Six parts by weight of No. 06 ground rubber reclaim were admixed with 12 parts of Gilsonite and 12 parts of blown asphalt (melting point 270° F.). The mixture was heated to 450° F. for one hour with occasional gentle stirring. The mixture was fluid and substantially homogeneous after the one hour heating. It was then cooled to room temperature at which temperature it was a hard, brittle solid, easily communited in a common mortar by use of a pestle. The solid thus produced was ground to a size which passed through an 80 mesh size sieve. 100 pounds of the ground concentrate was then stirred into 1000 gallons of diesel oil and the fluid loss, according to the Baroid High Temperature-High Pressure test at 1000 p.s.i. and 180° F., determined. The fluid loss of the oil-base fracturing liquid thus made is set out in Table XII.

*Example 60*

Six parts by weight of ground vulcanized rubber tread stock (not reclaimed by digestion or mastication) were admixed with 1 part blown asphalt (M.P. 270° F.). One part Gilsonite, and 2 parts ground silica (1.5 to 6.0 microns in size). The mixture thus made was heated to 450° F. for one hour to produce a fluid homogeneous mass. The mass was then cooled to a brittle hard solid and ground to a size which passed through an 80 mesh sieve. 100 pounds of the thus ground concentrate were then admixed with 1000 gallons crude oil and the fluid loss, determined by the Baroid High Temperature-High Pressure test at 1000 p.s.i. and 140° F., determined.

*Example 61*

Example 60 was repeated employing a heavier crude. The fluid loss value obtained is set out in Table XII.

*Example 62*

Six parts by weight of No. 06 ground rubber reclaim were admixed with 6 parts of polyphenyl and 2.4 parts of the ground silica employed in Example 58. In the polyphenyl, the number of phenyl groups was between 7 and 12, the para-phenyl bonding predominating. The mixture was heated at between 450° and 500° F. for one hour, to produce a fluid homogeneous mixture, and cooled to form a brittle hard solid. The solid thus formed was ground to a size which passed through an 80 mesh sieve. The ground rubber-polyphenyl solid was then admixed substantially uniformly with diesel oil and the fluid loss ascertained at 180° F. and 1000 p.s.i. The results are set out in Table XII.

Example 63

Example 62 was repeated except that 0.15 part of Redicote-75, was admixed with the mixture of polyphenyl, ground reclaim rubber, and ground silica flour while the mixture was up to temperature. The fluid loss of the well fracturing liquid prepared is set out in Table XII.

Example 64

Six parts of No. 06 ground reclaim rubber were admixed with 3 parts of the polyphenyl (employed in Examples 62 and 63), 3 parts of Gilsonite, and 2.4 parts of the ground silica of the size employed above. The mixture thus made was heated to between 450° F. and 500° F. for an hour which produced a fluid homogeneous mass. The mass was then cooled which converted it to a hard brittle solid. The solid was ground to a particle size, which passed through an 80 mesh sieve. 100 pounds of the particulate material was then admixed per thousand gallons of diesel oil and the fluid loss ascertained at 180° F. and 100 p.s.i. The fluid loss value is set out in Table XII.

Example 65

Example 64 was repeated except that only 50 pounds of the polyphenyl-rubber concentrate was employed per 1000 gallons of diesel oil instead of 100 pounds. The fluid loss value was similarly obtained and is that set out in Table XII.

TABLE XII

| Ex. No. | Pounds of Rubber-Plasticizer Concentrate per 1,000 Gallons of Oil | Oil Admixed with Concentrate | Temperature Used in Test [1] | Fluid Loss in ml. in 25 Min. |
| --- | --- | --- | --- | --- |
| 59 | 100 | Diesel Oil | 180 | 25.5 |
| 60 | 100 | 50.5 API Gravity Crude Oil | 140 | 38.5 |
| 61 | 100 | 24.8 API Gravity Crude Oil | 140 | 6.2 |
| 62 | 100 | Diesel Oil | 180 | 14.5 |
| 63 | 100 | ...do... | 180 | 15.0 |
| 64 | 100 | ...do... | 180 | 8.0 |
| 65 | 50 | ...do... | 180 | 16.0 |

[1] All fluid loss tests were run at 1,000 p.s.i.

An examination of Table XII shows that rubber can be readily dispersed in a plasticizer oil illustrated by polyphenyl, blown asphalt, and Gilsonite, which is solid at room temperature, to produce a smoothly dispersed concentrate; that either reclaimed rubber or ground vulcanized rubber, which has not undergone reclaim treatment, can be so used; that after such concentrate is cooled it solidifies and can then be ground and admixed with commonly employed well-treating organic liquids to give low fluid loss values thereto.

Example 66

To illustrate further the effectiveness of the practice of the invention, the following well treatment was performed:

A well in Runnels County, Texas, having a total depth of 4329 feet and a bottom hole temperature of 128° F. was treated. It was cased with a 5½ inch casing and provided with a 2 inch tubing to a depth of 4290 feet. The pay zone extended between 4310 and 4318 feet and the casing in the pay zone was perforated with six shots per foot. A packer was positioned in the annulus between the tubing and the casing at a level of 4214 feet, which was 96 feet above the pay zone. Prior to treatment, the well was producing at the rate of 18 barrels of oil per day. The purpose of the treatment was to fracture effectively, the formation to increase the yield therefrom without the use of an excessive volume of fracturing fluid or the need to employ excessive pressure. The well was given a preparatory treatment by admixing 20 gallons of $CS_2$ with sufficient crude oil to flush out the well and introducing the mixture into the well through the tubing. The preparatory treatment was for the purpose of removing solidified paraffin and is not a part of the invention. Two hundred gallons of the oil-dispersed rubber concentrate of the invention was then prepared by admixing 640 pounds of S-bottoms, having a density of 8.14 pounds/gallon, and 600 pounds of diesel oil, having a density of 7.04 pounds/gallon, in a mixing tank. One half, i.e., 620 pounds, of this oil mixture was then transferred to a 250 gallon capacity reactor provided with stirring and heating means and heated to about 470° F. Four hundred pounds of No. 06 ground reclaimed rubber scrap, having the analysis set out hereinbefore were admixed slowly, while stirring, to the hot oil mixture, taking about 30 minutes for the addition and maintaining the temperature between 464° and 474° F. The reactor temperature was then held within this temperature range for an additional hour. The hot rubber-oil mixture was then admixed with the remaining half, i.e., 620 pounds, of the S-bottoms and diesel oil mixture and cooled to about 135° F., over a period of about 2 hours, to make a homogeneous rubber dispersion in the oil to be added to the base oil for fracturing. To the rubber-plasticizer composition were then admixed 160 pounds of fine silica and 10 pounds of Redicote-75 (described hereinbefore), and thereafter admixed 25,000 pounds of sand, of a size which passed through a 20 mesh sieve but was retained on a 40 mesh sieve. The 200 gallons of oil-dispersed rubber concentrate thus made were then admixed with 10,080 gallons (240 barrels) of lease oil, i.e., crude oil which was produced from the same field. The crude oil containing the rubber dispersed additament therein was pumped down the well in accordance with the method of the invention until the injection pressure attained caused fracturing of the formation. Thereafter 1554 gallons of lease oil were pumped down the well as a flush. The packer was then released in the annulus between the casing and tubing, the fracturing liquid in the well removed by pumping, and the well put back in production. Production therefrom was periodically observed thereafter and was found to continue to rise, the last production figure showing a production rate of 380 barrels per day.

Among the advantages of the practice of the invention are: low fluid loss into the formation from fracturing fluids during fracturing resulting in relatively low volume requirements of fracturing liquids and more effective fracturing; lessening of lost circulation from drilling muds during drilling; that any commonly available oil or plasticizer may be employed so long as it be composed in part of an aromatic oil, e.g., one having at least 10 percent thereof consisting of an oil containing aromatic rings; readily and economically available ingredients for the preparation of the fracturing drilling fluid, illustrative of which are reclaim rubber and S-bottoms, e.g., between 40–60 parts by weight of each per 100 pounds of plasticizer both the rubber and the S-bottoms being either salvaged products from a waste material or a by-product associated with a large volume chemical production; convenience of employing either a liquid or solid concentrate fluid-loss additament which is conveniently prepared at a central point having facilities therefor and which then can be admixed with relatively large amounts of well working fluids at or near the site of the well.

Further advantages are that the invention may be practiced by employing the rubber-plasticizer composition of the invention in fracturing fluids which contain propping agents, e.g., from 50 to 5000 pounds of 40–60 mesh sand per 1000 gallons of fracturing fluid and by employing the composition as an adjuvant to certain other fluid-loss additaments, e.g., between 250 and 1750 pounds of finely ground silica per 1000 gallons of the fluid with or without an oil-wetting agent.

Having described the invention, what is claimed and desired to be protected by Letters Patent is:

1. The method of preparing a well treating fluid consisting essentially of heating a mixture of between 0.3 and 2 parts by weight of particulated rubber selected from the class consisting of unvulcanized, vulcanized, and reclaimed natural and synthetic rubber which had previously been ground and 1 part of a solid hydrocarbon selected from the class consisting of polyphenyl, Gilsonite, and blown asphalt at a temperature of between about 400° F. and about 500° F. until a substantially homogeneous concentrate is obtained, cooling concentrate so prepared to a solid; pulverizing the solid thus obtained to a powder; admixing the powder thus made in an amount of between about 40 pounds and about 100 pounds of the powder per thousand gallons of an oil-base well-treating fluid selected from the class consisting of crude petroleum oil, kerosene, diesel oil, gas oils, low-viscosity residuum oils from fractionating columns and crackers, oil-water emulsions, and oil-base liquids gelled by admixture therewith of a thickening agent.

2. The method of treating a well which consists essentially of admixing, with the well treating fluid prepared according to claim 1, pulverulent silica, and injecting, into the well and back into the formation at fracturing pressures, the well treating liquid so made.

References Cited by the Examiner

UNITED STATES PATENTS

| | | | |
|---|---|---|---|
| 308,189 | 11/1884 | Montgomery | 260—719 |
| 627,689 | 6/1889 | Heinzerling | 260—714 |
| 2,038,556 | 4/1936 | Ellis | 260—759 |
| 2,223,027 | 11/1940 | Dawson et al. | 252—8.5 |
| 2,297,871 | 10/1942 | Campbell | 260—760 |
| 2,481,339 | 9/1949 | Penfield | 252—8.5 |
| 2,697,071 | 12/1954 | Kennedy et al. | 252—8.5 |
| 2,743,233 | 4/1956 | Fisher | 252—8.5 |
| 2,779,735 | 1/1957 | Brown et al. | 252—8.55 |
| 2,793,996 | 5/1957 | Lummus | 252—8.55 |
| 2,801,967 | 8/1957 | Wilson | 252—8.5 |
| 2,805,990 | 9/1957 | Bergman | 252—8.5 |
| 2,812,161 | 11/1957 | Mayhew | 252—8.5 |
| 2,894,906 | 7/1959 | Sheeler | 252—8.5 |
| 3,046,222 | 7/1962 | Phansalker et al. | 252—8.55 |

JULIUS GREENWALD, *Primary Examiner.*

JOSEPH R. LIBERMAN, ALBERT T. MEYERS,
*Examiners.*

H. B. GUYNN, *Assistant Examiner.*